(12) United States Patent
Fawls et al.

(10) Patent No.: US 6,652,682 B1
(45) Date of Patent: Nov. 25, 2003

(54) PROPELLANT COMPOSITION COMPRISING NANO-SIZED BORON PARTICLES

(75) Inventors: Christopher J. Fawls, Charlotte Hall, MD (US); Joel P. Fields, Charlotte Hall, MD (US); Timothy J. Dunn, Alexandria, VA (US); Douglas Elstrodt, Waldorf, MD (US); Michael L. Hudson, Indian Head, MD (US); Kerry L. Wagaman, Bryantown, MD (US); Kenneth Kuo, State College, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 9 days.

(21) Appl. No.: 09/982,389

(22) Filed: Oct. 17, 2001

(51) Int. Cl.⁷ .................. C06B 43/00; C06B 31/00; C06B 31/28
(52) U.S. Cl. .................. 149/22; 149/45; 149/46; 149/61
(58) Field of Search ............... 149/22, 45, 46, 149/61

(56) References Cited

U.S. PATENT DOCUMENTS

| | | | |
|---|---|---|---|
| 3,354,172 A | 11/1967 | Takaes | 260/308 |
| 4,141,768 A | 2/1979 | Lo et al. | 148/19.3 |
| 4,274,893 A * | 6/1981 | Mars et al. | 149/2 |
| 4,331,080 A * | 5/1982 | West et al. | 102/301 |
| 5,074,938 A | 12/1991 | Chi | 149/21 |
| 5,589,661 A * | 12/1996 | Menke et al. | 149/19.4 |
| 5,596,168 A * | 1/1997 | Menke et al. | 149/19.4 |
| 5,597,947 A * | 1/1997 | Stephens | 44/268 |
| 5,668,345 A * | 9/1997 | Schroeder et al. | 102/289 |
| 5,700,974 A * | 12/1997 | Taylor | 149/109.6 |
| 5,837,930 A | 11/1998 | Mul et al. | 149/19.6 |
| H1768 H * | 1/1999 | Mueller et al. | 149/46 |
| 6,165,295 A * | 12/2000 | Wagaman | 149/46 |
| 6,210,504 B1 * | 4/2001 | Thompson | 149/1 |
| 6,328,831 B1 * | 12/2001 | Wagaman | 149/45 |
| 6,331,220 B1 * | 12/2001 | Wagaman | 149/45 |

\* cited by examiner

*Primary Examiner*—Michael J. Carone
*Assistant Examiner*—Aileen B. Felton
(74) *Attorney, Agent, or Firm*—Mark Homer

(57) ABSTRACT

The present invention is a propellant composition comprising from about 2 percent to about 46 percent, by weight, boron particles having a diameter of less than about 500 nanometers. Liquid or gel embodiments of the invention may also include adding the boron particles to a liquid fuel in order to form a liquid fuel system. Examples of such liquid fuels include ethyl ammonium nitrate (EAN), triethyl amine nitrate (TEAN), Cyclotetramethylenetetranitramine (HMX), trinitrotoluene (TNT), jet fuel formula (JP-10), kerosene, RJ-4, or other hydrocarbon based fuels. These liquid fuel systems can be part of bipropellants wherein the liquid fuel system is stored separately from an oxidizing agent and the two are mixed during operation. Examples of oxidizing agents may include nitrogen tetroxide, oxygen, hydrogen peroxide, hydroxyl ammonium perchlorate (HAP), hydoxyl ammonium nitrate (HAN), ammonium perchlorate, ammonium nitrate, ammonium dinitramide (ADN), or a combination of said chemicals. One specific preferred embodiment of the invention comprises a fuel comprising approximately 61.60 percent by weight EAN, approximately 23 percent by weight boron particles having a diameter of less than about 500 nanometers, approximately 3.85 percent by weight ammonium nitrate, and approximately 11.55 percent by weight water coupled with an oxidizing agent comprising approximately 38 percent by weight hydrogen peroxide, approximately 46 percent by weight ammonium nitrate, and approximately 16 percent by weight water. The present invention also comprises a monopropellant formed by adding the nano-sized boron particles to a fuel containing oxygen. Another embodiment of the invention is a solid propellant wherein the nano-sized boron particles are used as a metal fuel component or as a portion of a metal fuel component and are mixed with an oxidizing agent and bound with a binder.

20 Claims, No Drawings

PROPELLANT COMPOSITION COMPRISING NANO-SIZED BORON PARTICLES

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention pertains to the field of propellant compositions and more particularly to propellants or fuel compositions containing boron particle solids which are less than about 500 nanometers in size and in concentrations ranging from about two percent to about forty-six percent by weight.

2. Brief Description of the Prior Art

Propellant compositions typically comprise an oxidizer, a fuel, a binder, a gelling agent, or a variety of other additives depending upon whether the propellant formulation is in a solid, liquid, or a gel form. While many chemicals have been used as fuels in propellant compositions, many metals have been preferred as fuels, particularly for solid propellant formulations, because metals can be used to increase the burning rate and the specific impulse of propellant formulations. Propellant compositions containing metals such as aluminum, boron, magnesium, and titanium have been designed, however, the majority of these types of propellant compositions used for rocket and missile propulsion use aluminum as a fuel. This is because of the low cost of aluminum and because aluminum tends to ignite and burn more easily than other ingredients. However, there are several problems with using aluminum in propellant compositions including the relatively low specific impulse generated by aluminum as well as potential environmental problems associated with aluminum compounds. In addition, the aluminum has a tendency to interfere with guidance controls of some missile and rocket systems. Also, aluminum is likely not stable in compositions containing water because aluminum has a tendency to react with water.

In order to address some of these potential problems associated with using aluminum as a fuel in propellant compositions as noted above and increase the efficiency of aluminum based propellants, researchers have begun to analyze the viability of incorporating nanotechnology to increase the burning rate associated with aluminum powder in current propellants. French and German scientists have begun testing nano-sized aluminum particles, on the order of 50 to 200 nanometers in diameter, in current propellant formulations and have made initial determinations indicating that under laboratory conditions, such nano-sized aluminum particles increase the burning rate and combustion characteristics of current propellant formulations. However, increasing the burning rate will not alleviate the potential for guidance system interference.

As noted above, propellant formulations containing boron have been developed that may address some of the limitations associated with propellant formulations containing aluminum. For instance, U.S. Pat. Nos. 3,354,172; 4,141,768; 5,074,938; and 5,837,930 all disclose propellant formulations that contain or may contain boron as a fuel. This is due to the fact that boron has a low molecular weight and a high energy of combustion, making it an attractive fuel for propellant formulations. However, due to a thin layer of boron oxide that forms on the particle surface that hinders combustion, ignition is difficult, making such compositions unrealistic for uses that require high precision and dependability such as for military applications.

Based upon the above, it would be desirable to provide a propellant composition that comprises nano-sized boron particles in order to address the ignition problems associated with boron and increase the specific impulse and combustion characteristics of current propellant formulations without interfering with missile or rocket guidance systems.

SUMMARY OF THE INVENTION

Accordingly, it is an object of this invention to provide a propellant composition comprising nano-sized boron particles.

It is a further object of this invention to provide a solid propellant composition comprising nano-sized boron particles.

It is yet a further object of this invention to provide liquid or gel propellant compositions comprising nano-sized boron particles.

This invention accomplishes these objectives and other needs related to propellant compositions by providing a propellant formulation comprising from about 2 percent to about 46 percent, by weight, boron particles having a diameter of less than about 500 nanometers. In more preferred embodiments of the invention, the diameter of the boron particles will be less than about 150 nanometers; and a still more preferred embodiment of the invention, the boron particle diameter will be less than about 50 nanometers. Liquid or gel embodiments of the invention may also include adding the boron particles to a liquid fuel in order to form a liquid fuel system. Examples of such liquid fuels include ethyl ammonium nitrate (EAN), triethyl amine nitrate (TEAN), Cyclotetramethylenetetranitramine (HMX), trinitrotoluene (TNT), jet fuel formula (JP-10), kerosene, RJ-4, or other hydrocarbon based fuels. These liquid fuel systems can be part of bipropellants wherein the liquid fuel system is stored separately from an oxidizing agent and the two are mixed during operation. Examples of oxidizing agents may include nitrogen tetroxide, oxygen, hydrogen peroxide, hydroxyl ammonium perchlorate (HAP), hydoxyl ammonium nitrate (HAN), ammonium perchlorate, ammonium nitrate, ammonium dinitramide (ADN), or a combination of said chemicals. One specific preferred embodiment of the invention comprises a fuel comprising approximately 61.60 percent by weight EAN, approximately 23 percent by weight boron particles having a diameter of less than about 500 nanometers, approximately 3.85 percent by weight ammonium nitrate, and approximately 11.55 percent by weight water coupled with an oxidizing agent comprising approximately 38 percent by weight hydrogen peroxide, approximately 46 percent by weight ammonium nitrate, and approximately 16 percent by weight water. The present invention also comprises a monopropellant formed by adding the nano-sized boron particles to a fuel containing oxygen. Another embodiment of the invention is a solid propellant wherein the nano-sized boron particles are used as a metal fuel component or as a portion of a metal fuel component and are mixed with an oxidizing agent and bound with a binder.

DESCRIPTION OF THE PREFERRED EMBODIMENT

There are some fundamental differences associated with using fuels containing nano-sized particles within propellants versus standard sized fuel powders. For nano-sized particles, the combustion process is largely kinetically controlled rather than diffusion controlled as in standard sized powders. This difference in kinetic rates between nanoparticles and bulk material can greatly increase reaction rates. Therefore, by using nano-sized particles within propellants, one can arrive at high combustion efficiency and, thereby, increase the thrust produced by the propellant using the same actual weight of propellant.

As mentioned above, ignition problems have resulted in limited use of boron as a fuel in propellants, even though it has a high heat of oxidation, on the order of 140 kJ/cm$^3$. However, the unique features of nanoparticle boron, boron particles having a diameter of less than about 500 nanometers, allows one to overcome this problem as well as producing many other physical characteristics that are beneficial for use in propellants. Nanoparticle boron overcomes the ignition problem by creating much greater surface areas for ignition (up to the order of 50 m$^2$/g). Other unique features of nano-sized boron particles that make them ideal for use in propellants are: short burning times (as low as microseconds); possibility for storing excess amounts of energy; controlled ignition with special passivation materials; enhanced amount of energy released by catalytic reactions; particle size dependent reaction rates; ability to serve as gelling agents for gelled propellants; enhanced burning rates of solid propellants; enhanced density impulses of solid propellant rockets and solid-fuel ramjets; and, the possibility for developing high-speed deflagration waves and detonation waves using self-propagating high-temperature synthesis reactions.

The present invention is a propellant composition, comprising from about 2 percent to about 46 percent, by weight, boron particles having a diameter of less than about 500 nanometers. Any method to make ultra-fine metallic powders can be used to create the nano-sized boron particles. Current methods for producing nano-sized particles include explosive evaporation of metallic wires, micro-shock disintegration, low-pressure vapor condensation, and decomposition of organo-metallic compounds. While many methods may be used to create the nano-sized boron particles, one preferred type for the nano-sized boron particles would be particles in an amorphous phase, rather than a crystalline phase. This will allow for increased surface area. A preferred size of the nano-sized boron particles is less than 150 nanometers with another preferred size being less than 50 nanometers. Preferred sizes of the boron particles can be adjusted between 40 nanometers and 150 nanometers to control their iginition and combustion behavior dependent upon the mission of the propellant being produced with the particles. Also, to avoid undesired ignition and degradation of the boron particles caused by oxidation, the particles may be passivated and stabilized by a very thin layer of a material that is more inert than boron and will not easily oxidate. Examples of such materials are boron oxide and polymers containing boron-oxygen.

The present invention also comprises a propellant composition wherein the nano-sized boron particles are added to a liquid fuel to form a liquid fuel system. The boron particles can be mixed, suspended or slurried into the liquid fuel depending upon the state of the liquid fuel. Examples of liquid fuels that may be used to form this liquid fuel system include ethyl ammonium nitrate/ethyl amine nitrate (EAN), triethyl amine nitrate (TEAN), Cyclotetramethylenetetranitramine (HMX), trinitrotoluene (TNT), jet fuel formula (JP-10), kerosene, RJ-4, or other hydrocarbon based fuels. This liquid fuel system may also be used in a bipropellant in conjunction with an oxidizing agent. In operation the liquid fuel system would be packaged in a tank or container to keep the liquid fuel separate from the oxidizing agent. During operation, the liquid fuel mixes with an oxidizing agent to provide useful thrust. The preferred liquid fuel system to oxidizing agent ratio comprises from about 1 to 1 by weight to about 1 to 10 by weight. Examples of oxidizing agents that may be used to form the above bipropellant are nitrogen tetroxide, oxygen, hydrogen peroxide, hydroxyl ammonium perchlorate (HAP), hydoxyl ammonium nitrate (HAN), ammonium perchlorate, ammonium nitrate, ammonium dinitramide (ADN), hydrazinium mononitrate, or a combination of said chemicals.

One preferred embodiment of the bipropellant discussed above includes using EAN in the liquid fuel system. This embodiment of the invention might also include an oxidizing agent comprising hydrogen peroxide, ammonium nitrate, and water. One preferred embodiment of this oxidizing agent comprises approximately 38 percent by weight hydrogen peroxide, approximately 46 percent by weight ammonium nitrate, and approximately 16 percent by weight water. A further preferred embodiment of the invention might include the above mentioned liquid fuel system comprising approximately 61.60 percent by weight EAN, approximately 23 percent by weight boron particles having a diameter of less than about 500 nanometers, approximately 3.85 percent by weight ammonium nitrate, and approximately 11.55 percent by weight water.

While the nano-sized boron particles can act as a gelling agent when used in a gel-type fuel, the present invention can also comprise a further gelling agent. One preferred embodiment of the invention comprises a further gelling agent in an amount of about 3 percent by weight. One example of such a gelling agent is fumed silica.

In another embodiment of the invention, the propellant composition may comprise a monopropellant formed by adding the nano-sized boron particles to a fuel containing oxygen. Examples of such fuels are HAP, HAN, EAN, TEAN, ADN, ammonium nitrate, ammonium perchlorate, hydrazinium mononitrate, nitroglycerine, propylene glycol dinitrate (PGDN), other nitrate esters, or a combination of said chemicals. When forming such a monopropellant, it is preferable to put a protective coating around the boron particles to prevent early ignition of the monopropellant. Examples of such protective coatings include polymeric gels or plastic coatings. One preferred coating is vinylidene difluoride and hexafluoropropylene.

In yet another embodiment of the invention the propellant composition may comprise a solid propellant wherein the nano-sized boron particles act as the metal fuel component. Other metals, such as aluminum, could also be mixed with the boron particles to make up this metal fuel component. This type of propellant may also include a binder. The preferred amount of such a binder comprises from about 3 percent by weight to about 20 percent by weight. Examples of such a binder include glycidal azide polymer (GAP), nitrate esters, HTPB, CTPB, other carboxy terminated materials, other hydroxy terminated materials, or cellulose acetate. A solid propellant of the present invention may also include an oxidizing agent comprising less than about 80 percent by weight. Examples of such an oxidizing agent include ammonium perchlorate, hydroxyl ammonium perchlorate, hydroxyl amine nitrate, or other energetic ingredients containing NF2 groups.

Finally, the invention also comprises an explosive composition, comprising boron particles having a diameter of less than about 500 nanometers. These explosive compositions would be similar to the propellant compositions discussed above, however the fuel and oxidizer ratios would be adjusted by one skilled in the art to provide a detonatable mixture. Examples of such mixtures include adding the following to the nano-sized boron particles: TNT, cyclotrimethylenetrinitramine (RDX), HMX, nitroglycerine, nitrocellulose, rubber binders, waxes, and other metals such as aluminum.

The general nature of the invention having been set forth, the following examples are presented as specific illustrations thereof. It will be understood that the invention is not limited to these specific examples, but can be practiced with various modifications that will be recognized by one of ordinary skill in the art. In fact, as noted in the background section, several patents describe examples of propellant compositions that contain boron as a fuel including U.S. Pat. Nos. 3,354,172; 4,141,768; 5,074,938; and 5,837,930. The examples of such fuels within these patents are hereby incorporated by reference. The standard sized boron powder used in these examples could be replaced with the nano-sized boron particles described herein to create propellants with significantly higher burn rates and combustion efficiencies.

EXAMPLE 1

The following sets for the steps for creating an EAN/boron based fuel coupled with the liquid oxidizer PERSOL 1 disclosed in U.S. Pat. No. 6,165,295. The procedure is for one preferred performance propellant using 100 grams of the EAN/boron fuel and 39 grams of the PERSOL 1 oxidizer follows. The weight percentages of the ingredients in the fuel and oxidizer are listed below:

Fuel
    EAN—61.60%
    Ammonium Nitrate (AN)—3.85%
    Deionized Water—11.55%
    Nano-sized Boron Particles—23.00%
Oxidizer
    Hydrogen Peroxide—38.00%
    Deionized Water—16.00%
    AN—46.00%

To prepare the EAN/boron fuel, first place the EAN into a beaker and then add the water to the beaker. Weigh out crystalline AN and then add it to the beaker. Place a stirring bar into the beaker and cover with foil. Stir on a fast setting for approximately 10 minutes or until the AN has completely dissolved. Add the nano-sized boron particles to the mixture. Hand mix carefully until the mixture is thoroughly blended; this will create a gel. One should be careful not to entrain air into the gel during mixing. Finally, place the fuel gel under vacuum to de-gas.

To prepare the oxidizer, place the hydrogen peroxide into a beaker and add the water. Add crystalline AN to the beaker, place a stir bar in the beaker and cover with foil. Stir on a fast setting for approximately 10 minutes or until the AN has completely dissolved. The fuel and oxidizer can then be used as bipropellants where they are injected and atomized in a rocket engine for combustion. These two bipropellants should not be combined prior to use for combustion and propulsion.

EXAMPLE 2

The following two compositions are examples of embodiments of the invention for solid formations:

Formulation A (solid propellant)
    10% HTPB Binder
    1% DOA Plasticizer
    76% Ammonium Perchlorate
    13% Nano-sized Boron Particles
Formulation B (solid fuel composition)
    75% HTPB Binder
    10% Aluminum
    15% Nano-sized Boron Particles What is described are specific examples of many possible variations on the same invention and are not intended in a limiting sense. The claimed invention can be practiced using other variations not specifically described above.

What is claimed is:

1. A gelled bipropellant composition, comprising:
    a liquid fuel selected from the group of ethyl ammonium nitrate (EAN), triethyl ammonium nitrate (TEAN), cyclotetramethylenetetranitramine (HMX), trinitrotoluene (TNT), jet fuel formula (JP-10), kerosene, RJ-4, or other hydrocarbon based fuels;
    an oxidizing agent selected from the group of nitrogen tetroxide, oxygen, hydrogen peroxide, hydroxyl ammonium perchlorate (HAP), hydroxyl ammonium nitrate (HAN), ammonium perchlorate, ammonium nitrate, ammonium dinitramide (ADN), hydrazinium mononitrate, water, or a combination thereof; and,
    from about 2 percent to about 46 percent, by weight, boron particles having a diameter of less than about 100 nanometers wherein the boron particles act as a gelling agent when mixed with the liquid fuel.

2. The gelled bipropellant composition of claim 1, wherein the liquid fuel comprises EAN.

3. The gelled bipropellant composition of claim 2, wherein the oxidizing agent comprises hydrogen peroxide, ammonium nitrate, and water.

4. The gelled bipropellant composition of claim 3, wherein the oxidizing agent comprises approximately 38 percent by weight hydrogen peroxide, approximately 46 percent by weight ammonium nitrate, and approximately 16 weight percent water.

5. The gelled bipropellant composition of claim 4, comprising approximately 61.60 percent by weight EAN, approximately 23 percent by weight boron particles having a diameter of less than about 100 nanometers, approximately 3.85 percent by weight ammonium nitrate, and approximately 11.55 percent by weight water.

6. The gelled bipropellant composition of claim 5, further comprising a second gelling agent.

7. The gelled bipropellant composition of claim 6, wherein the second gelling agent comprises less than about 3 percent by weight.

8. The gelled bipropellant composition of claim 7, wherein the second gelling agent comprises fumed silica.

9. The propellant composition of claim 1, further comprising a monopropellant formed by adding the boron particles to a fuel containing oxygen.

10. The propellant composition of claim 9, wherein the fuel containing oxygen comprises a chemical selected from the group of HAP, HAN, EAN, TEAN, ADN, ammonium nitrate, ammonium perchlorate, hydrazinium mononitrate, nitroglycerine, propylene glycol dinitrate (PGDN), other nitrate esters, or a combination of said chemicals.

11. The propellant composition of claim 10, further comprising a protective coating surrounding the boron particles.

12. The propellant composition of claim 10, wherein the protective coating comprises vinylidene difluoride and hexafluoropropylene.

13. The propellant composition of claim 1, further comprising a solid propellant wherein the boron particles comprise a solid fuel.

14. The propellant composition of claim 13, further comprising other metals mixed with the boron particles comprising the solid fuel.

15. The propellant composition of claim 14, further comprising a binder comprising from about 3 percent by weight to about 20 percent by weight.

16. The propellant composition of claim 15, wherein the binder may be selected from the group comprising glycidal azide polymer (GAP), nitrate esters, HTPB, CTPB, other carboxy terminated materials, other hydroxy terminated materials, or cellulose acetate.

17. The propellant composition of claim 16, further comprising an oxidizing agent comprising less than about 80 percent by weight.

18. The propellant composition of claim 17, wherein the oxidizing agent is selected from the group comprising ammonium perchlorate, hydroxyl ammonium perchlorate, hydroxyl amine nitrate, or other energetic ingredients containing NF2 groups.

19. The gelled bipropellant of claim 1, wherein the diameter of the boron particles comprises less than about 50 nanometers.

20. The gelled bipropellant of claim 1, wherein the boron particles comprise an increased surface area by comprising an amorphous phase rather than a crystalline phase.

* * * * *